July 16, 1946.   J. G. BEARD ET AL   2,404,026
METHOD OF AND SYSTEM FOR TRANSLATING SIGNALS
Filed March 29, 1944
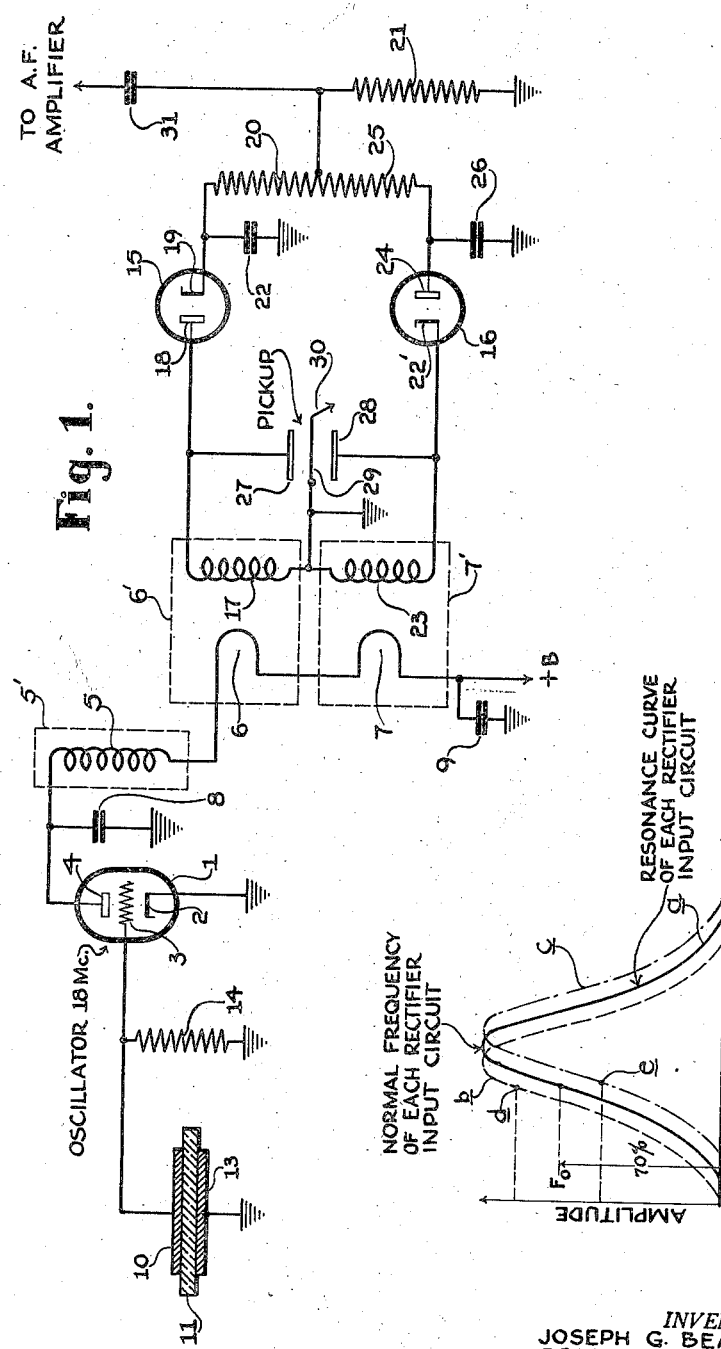
INVENTORS.
JOSEPH G. BEARD.
ROBERT W. HARRALSON.
BY
ATTORNEY Patented July 16, 1946

2,404,026

UNITED STATES PATENT OFFICE 2,404,026

METHOD OF AND SYSTEM FOR TRANSLATING SIGNALS

Joseph G. Beard, Haddonfield, and Robert W. Harralson, Masonville, N. J., assignors to Radio Corporation of America, a corporation of Delaware Application March 29, 1944, Serial No. 528,611

12 Claims. (Cl. 179—100.4)

Our present invention relates to signal translating methods and systems, and more particularly to a novel method of, and system for, translating a physical displacement of a mobile element into a corresponding voltage through the agency of high frequency oscillatory energy.

Prior systems and methods have been proposed for translating a physical displacement of a mobile element, such as that of a phonograph record stylus, into a corresponding voltage by utilizing high frequency oscillations. In such systems a characteristic of the oscillations, either amplitude or frequency, is varied in response to the aforesaid displacement, and a detector circuit is used to derive from the varied oscillations the desired corresponding voltage. One of the operating disadvantages of such prior systems has been that the high frequency oscillations have undergone amplitude and/or frequency variations at their source, or otherwise without reference to the displacement of the mobile element, and such inadvertent and undesired variations have been detected, thereby adversely affecting the resultant detected voltage. For example, microphonics, or ballistics, in the oscillator tube of such prior systems have tended to affect the detected resultant voltage.

It is one of the main objects of our present invention to provide a method of, and system for, balancing out amplitude and/or frequency changes the existence of which in the high frequency oscillatory energy is independent of such energy being subjected to variation in response to a physical displacement of a mobile element.

Another important object of our invention is to provide a method of translating the physical displacement of a mobile element into a resultant voltage by producing high frequency oscillations, and then applying the oscillations to substantially identical rectifier circuits whereby undesired variations in the oscillations are balanced out in the common output of the rectifiers, while a desired variation produced by displacement of the mobile element in a characteristic of the oscillations is derived from the rectifier circuits as a resultant differential voltage.

Another important object of our invention is to provide a novel method of, and system for, reproducing sound records, wherein high frequency oscillations are applied to substantially similar rectifier circuits employed in sound reproduction, the rectifier circuits being connected to provide output voltages of opposite polarity and having separate input circuits normally tuned to a common frequency which differs to a predetermined extent from the crystal-controlled frequency of the oscillator.

Still another object of our invention is to provide, in a phonograph record reproduction system, an oscillator which is crystal-controlled as to frequency, the oscillator output being fed to a pair of independent tuned circuits off-resonance to approximately the same frequency relative to the oscillator frequency, and the tuned circuits having electrically associated with them respective rectifiers provided with a common output resistor adapted to provide a resultant differential voltage corresponding to physical displacements of a mobile electrode common to both tuned circuits.

Still other objects of our invention are to improve generally the simplicity and efficiency of phonograph record reproduction systems, and more especially to provide a sound record reproduction system which is not only reliable and efficient in operation, but is free of undesired high frequency components in the detected output voltage.

Still other features will best be understood by reference to the following description, taken in connection with the drawing, in which we have indicated diagrammatically a circuit organization whereby our invention may be carried into effect.

In the drawing:

Fig. 1 shows the circuit diagram of a system embodying the invention,

Fig. 2 shows the ideal resonance curve of each rectifier input circuit, and a graphical analysis of the operation of the system.

Referring now to the system shown in Fig. 1, the tube 1 is the oscillator tube and may be of any well known type, as for example a triode. Our invention is not limited to any specific type of oscillator tube. The electron emitter or cathode 2 is grounded, while the plate or anode 4 is connected to the +B terminal of the direct current energizing source (not shown) over a series path consisting of coil 5, coupling link or coil 6 and coupling link or coil 7. Coils 6 and 7 may each have a single turn, but proper coupling to their respective secondaries (described below) is the prime consideration. Each of inductances or coils 5, 6 and 7 is preferably electrostatically shielded from the other to eliminate capacity coupling therebetween. The dotted rectangles 5', 6' and 7' represent shielding devices of any suitable form. The condenser 8 shunts the plate end of coil 5 to ground, whereas condenser 9 bypasses the lower end of inductance 7 to ground for radio frequency currents. The condenser 8 is given a magnitude to tune the plate circuit of the oscillator tube to the normal or operating frequency of the oscillator. That is, condenser 8 tunes the series combination of coils 5, 6 and 7 to the frequency of piezo-electric crystal 11.

The control grid 3 of oscillator tube 1 is connected to the high potential electrode 12 of crystal 11. The low potential electrode 13 is connected to ground. The grid resistor 14 is connected from grid 3 to ground, and provides a means for biasing the grid 3 negatively by virtue of grid current flow through the resistor. As already indicated, crystal 11 is tuned to the aforesaid operating frequency to which the plate circuit resonates. The crystal 11 may be provided with separate metal electrodes or metallic coatings functioning as electrodes. This is a familiar and well known form of crystal oscillator circuit, and produces relatively constant amplitude waves of the fixed frequency of crystal 11. By way of example, it may be assumed that the constants of the oscillator circuits are chosen to provide a frequency of 18 megacycles (mc.). Of course, the invention is in no way restricted to any particular frequency, nor to any particular type of oscillator circuit.

The fixed-frequency oscillations are introduced into a pair of rectifier circuits. The rectifiers may be of any well known form and are shown, by way of specific example, as of the diode type. Diodes 15 and 16 are connected in the manner shown. Diode 15 is provided with a resonant input circuit including coil 17 magnetically coupled to coupling link 6. The latter is included with coil 17 within the shielding means 6'. The diode anode 18 is connected to the high alternating potential end of coil 17, while the opposite end of the latter is grounded. The cathode 19 of diode 15 is connected back to ground through series-connected resistors 20 and 21. The cathode end of resistor 20 is bypassed to ground for radio frequency currents by condenser 22.

The diode 16 has its cathode 22' connected to the high alternating potential end of coil 23. The grounded end of coil 23 is connected in common to the grounded end of coil 17. Coils 7 and 23 are magnetically coupled, as in the case of coils 6 and 17, and are housed within the shielding means 7'. The anode 24 of diode 16 is connected to the junction of resistors 20 and 21 through a resistor 25. Condenser 26 bypasses the anode end of resistor 25 to ground for radio frequency currents. The coils 17 and 23 are each tuned to the same normal frequency by shunt condensers 27 and 28 respectively. The condensers 27 and 28 have a common electrode which is connected to the grounded junction of coils 17 and 23. The common electrode 29 is preferably a mobile armature located normally in spaced relation between the respective stator electrodes of condensers 27 and 28. The pivoted end of the armature 29 is grounded, and the free end of the armature is, as shown, provided with a stylus or needle 30.

The stylus 30 is of any desired form, and is adapted to ride along the grooves of a record in known manner. In this way the mechanical variations of the record are translated into corresponding physical displacements of the common electrode 29. The condensers 27 and 28 are accordingly varied in corresponding fashion, but in push-pull or opposing relation. Any desired or well known form of push-pull condenser may be employed for condensers 27 and 28. For example, the push-pull condenser construction shown by A. Badmaieff in his application Serial No. 490,614, filed June 12, 1943, granted March 13, 1945, as U. S. Patent No. 2,371,373, may be utilized as our condensers 27—28 with a common mobile electrode. It is to be clearly understood, in addition, that in place of using a record stylus 30 to displace common electrode 29, there may be employed, as for example in a microphone, any other device which will respond to a force to be indicated by displacing the electrode 29. In general, the mobile element 29 may be embodied in any transducer.

The oscillatory energy introduced into tuned rectifier input circuits 17—27 and 23—28 by the separate coupling elements 6 and 7 is varied in amplitude in response to the variations in capacity of condensers 27 and 28. Normally the oscillator frequency is of such a value that it falls at a point approximately 70% of the peak resonant voltage of tuned circuits 17—27 and 23—28. Hence, if the oscillator frequency is 18 mc., the normal resonant frequency of the rectifier input circuits may readily be calculated from the relation shown in Fig. 2. Here the solid line single-peak resonance curve $a$ is ideally assumed to be that of each of input circuits 17—27 and 23—28. It is obvious that if the mobile electrode 29 is instantaneously moved towards the stator of condenser 27 the capacity of the latter will increase, while the capacity of condenser 28 will concurrently decrease. This means that the frequency of circuits 17—27 will be decreased, while that of circuit 23—28 will be correspondingly increased. The opposing frequency shifts or deviations of the two input circuits will, of course, correspond to the stylus motion through the record groove. The sound record is not shown since those skilled in the art of sound reproducing are well acquainted with the technique of reproducing sound from records.

Opposite detuning of the respective rectifier input circuits relative to the normal or peak resonant frequency of curve $a$ of Fig. 2 causes the oscillator voltage injected or induced in them to vary oppositely in amplitude and consequently develops a variable voltage across the common load resistor 21. The variable voltage is representative of the original sounds which were translated into groove variations on the record.

The functioning of the system will now be more fully explained, special reference being made to the curves of Fig. 2. In the latter "frequency" as the abscissa is plotted against "amplitude" as the ordinate. The solid line curve $a$ is the normal resonance curve of each rectifier input circuit, as explained previously. The point $F_0$ on curve $a$ shows the degree of initial mistuning or off-resonance of the oscillator frequency relative to the normal frequency of the rectifier input circuits. The arrangement, including the degrees of coupling of coils 6 and 7 to their respective secondaries, is such that with armature 29 in its normal position the same amplitude of induced oscillatory voltage will be developed in the respective rectifier input circuits. Under these conditions, the rectifiers will develop across resistor 21 equal rectified voltages, the voltages developed by each of the rectifiers across resistor 21 being proportional to the amplitude of the high frequency oscillatory energy in its input circuit. Due to the fact that resistor 21 has its ungrounded end connected to unlike electrodes of said diodes, it follows that the ungrounded end of the resistor 21 will be at zero potential due to cancellation of the opposing rectified voltages. Hence, in the median or normal position of mobile electrode 29 the succeeding audio frequency amplifier (not shown) derives no voltage from the ungrounded end of resistor 21. Condenser 31 is an audio frequency coupling condenser. Resistors 20 and 25 act as loading elements to determine the "Q" of the respective rectifier input circuits. They further prevent a short circuit on each coil 17, 23 by the other and its respective diodes.

Let it now be assumed that mobile electrode 29 is shifted towards the stator of condenser 27. At that instant the frequency of circuit 17—27 is decreased since condenser 27 has its capacity increased, while the frequency of circuit 23—28 is increased since condenser 28 has its capacity decreased. The dash line curve $b$ in Fig. 2 represents the instantaneous shift in the resonance curve of circuit 17—27 due to the decrease in resonant frequency of circuit 17—27. The dot and dash line curve $c$ represents the instantaneous shift in the resonance curve of circuit 23—28 due to the increase in resonant frequency of the latter circuit. The oscillator frequency $F_0$ (assumed to be 18 mc.) has not changed during the shift in the position of electrode 29.

Hence, points $d$ and $e$ indicate the respective locations on shifted curves $b$ and $c$ of the oscillator frequency $F_0$. There will now be induced a greater amplitude of oscillatory voltage in circuit 17—27 than in circuit 23—28, as is readily observed from Fig. 2 because point $d$ exceeds point $e$ in amplitude. Hence, the ungrounded end of resistor 21 will be at a positive potential relative to ground, and the potential will be of a magnitude depending upon the algebric sum of the rectified voltages. In other words, the rectified voltages are differentially combined to produce a resultant voltage proportional to the difference between the amplitudes of oscillatory voltages induced in the rectifier input circuits. By operating normally at the steepest point on the slope of the resonance curve $a$, the resultant rectified voltage will be of maximum values for varying frequency deviations of the rectifier input circuits. The 70% off-resonance point $F_0$ is such a steep point, and is also a point of the curve where greatest linearity exists.

Where the displacement of mobile electrode 29 is relatively slow, as in response to miscellaneous physical changes, the resultant rectified voltage across resistor 21 may be utilized in any desired manner. For example, the voltage may be visually indicated in a measuring device, or it may be employed to operate a correction or work circuit as in control circuits.

Any undesired frequency modulation effects or amplitude modulation effects, arising otherwise than by movement of armature 29, which may develop in the oscillatory energy induced in the rectifier input circuits 17—27 and 23—28 will balance out across resistor 21. The balancing out of such undesired amplitude variations or frequency variations takes place by virtue of the fact that output resistor 21 is in push-pull relation to rectifiers 15 and 16. It will be obvious that any change in amplitude and/or frequency of the oscillatory energy applied to coils 17 and 23, not due to movement of armature 29, will have the same effect at the two rectifiers. Hence, the rectification products of these effects will cancel out across resistor 21. Our system is, therefore, non-sensitive to microphonics, or ballistics, in the oscillator tube 1. From a generic viewpoint we provide a system of record reproduction wherein identical changes in oscillatory high frequency energy are applied to identical rectifier circuits, and derive therefrom the rectification products in opposition. Accordingly, such changes in oscillatory energy, whether of amplitude or of frequency, balance out. However, the pickup device, or more generally the common tuning adjustment device, causes opposite changes in the two identical rectifier circuits thereby providing a resultant differential component of rectified voltage. From a generic viewpoint the input network of the rectifiers comprises a pair of reactances of like reactive sign (coils 17 and 23 being of like reactive sign), and each of the pair of reactances is tuned by a respective reactance of opposite reactive sign (condensers 27, 29 and 29, 28 are of opposite reactive sign relative to their respective coils 17 and 23).

Although our invention lends itself readily to use of a crystal-controlled oscillator, and we prefer to employ such an oscillator, the crystal 11 can, if desired, be dispensed with, inasmuch as the aforesaid balancing action as to changes in oscillator frequency can be relied upon to afford satisfactory operation, even in the absence of crystal control. Further, the invention is readily adapted for use with laterally-cut records or "hill and dale" records.

While we have indicated and described a system for carrying our invention into effect, it will be apparent to one skilled in the art that our invention is by no means limited to the particular organization shown and described, but that many modifications may be made without departing from the scope of our invention.

What we claim is:

1. A method which includes the steps of generating high frequency oscillations of a predetermined frequency, introducing said oscillations into a pair of resonant circuits tuned to a common frequency differing by a predetermined relatively small frequency value from said oscillation frequency, separately rectifying voltages induced in each of said tuned circuits, combining in polarity opposition the rectified voltage resulting in each of said rectification steps, and concurrently varying in opposite senses the frequency of each of said tuned circuits in response to displacements of a mobile element.

2. In combination, a pair of rectifiers having a common output resistor, a separate tuned input circuit connected to each rectifier, means for tuning said separate input circuits to a common predetermined high frequency, said means including a common mobile element whereby the frequencies of said input circuits may be concurrently varied in opposite senses, and means for applying in substantially identical manner to said input circuits high frequency oscillations of a frequency substantially different from the common predetermined frequency of said input circuits.

3. In combination, a pair of rectifiers having a common output resistor, a separate tuned input circuit connected to each rectifier, means for tuning said separate input circuits to a common predetermined high frequency, said means including a common adjustable element whereby the frequencies of said input circuits may be concurrently varied in opposite senses, means for applying in substantially identical manner to said input circuits high frequency oscillations of a frequency substantially different from the common predetermined frequency of said input circuits, and means for accurately maintaining said high frequency oscillations at said different frequency.

4. In combination, a pair of rectifiers having a common output resistor, a separate tuned input circuit connected to each rectifier, means for tuning said separate input circuits to a common predetermined high frequency, said means including a common mobile element whereby the frequencies of said input circuits may be concurrently varied in opposite senses, means for applying in substantially identical manner to said input circuits high frequency oscillations of a frequency substantially different from said common frequency of said input circuits, and said mobile element including a phonograph record stylus adapted to vary said mobile element in response to groove modulations of a sound record.

5. In combination with a crystal-controlled high frequency oscillator including a pair of separately shielded output elements, a pair of rectifiers each having its respective resonant input circuit, each of said input circuits being reactively coupled to a respective one of said output elements, said input circuits including a pair of resonating condensers of the type provided with a common mobile electrode, and a common output resistor connected in the space current paths of said rectifiers, said rectifiers being arranged in polarity opposition.

6. A method which includes the steps of generating high frequency oscillations of a predetermined frequency, inducing in response to said oscillations at least two resonant currents of a common frequency differing by a predetermined relatively small frequency value from said predetermined oscillation frequency, separately rectifying said induced currents, combining in polarity opposition the rectified voltage resulting in each of said separate rectification steps, and concurrently varying in opposite senses the frequency of each of the induced currents.

7. In combination, a pair of diode rectifiers having a common output resistor, a separate tuned input circuit connected to each rectifier, means for tuning said separate input circuits to a common predetermined high frequency, said means including a pair of condensers having a common adjustable element whereby the frequencies of said input circuits may be concurrently varied in opposite senses, and means for applying in substantially identical manner to said input circuits high frequency oscillations of a frequency substantially different from said common predetermined frequency of said input circuits.

8. In combination, a pair of rectifiers having a common output resistor, a separate tuned input circuit connected to each rectifier, means for tuning said separate input circuits to a common predetermined high frequency, said means including a pair of condensers having a common mobile electrode whereby the frequencies of said input circuits may be concurrently varied in opposite senses, means for applying in substantially identical manner to said input circuits high frequency oscillations of a frequency substantially different from said common predetermined frequency of said input circuits, and a piezo-electric crystal device for accurately maintaining said high frequency oscillations at said different frequency.

9. In combination, a pair of rectifiers having a common output resistor, a separate tuned input circuit connected to each rectifier, a separate condenser for tuning each input circuit to a common predetermined high frequency, said condensers including a common mobile electrode whereby the frequencies of said input circuits may be concurrently varied in opposite senses, a crystal-controlled oscillator for applying in substantially identical manner to said input circuits high frequency oscillations of a frequency substantially different from said common frequency of said input circuits, and a record stylus operatively associated with the mobile electrode to produce physical displacements of the latter in response to groove variations of a sound record.

10. In combination with a crystal-controlled high frequency oscillator including a pair of series-arranged output elements, a pair of rectifiers each having its respective resonant input circuit, each of said input circuits being reactively coupled to a respective one of said output elements, said input circuits including a pair of resonating condensers of the type provided with a common mobile electrode, a common output resistor connected in the space current paths of said rectifiers, said rectifiers being arranged in polarity opposition, and sound-responsive means for actuating said mobile electrode.

11. In a system for translating sound-representative modulations into sound wave currents, a source of high frequency oscillations, a pair of rectifiers having separate input circuits, reactive means common to said input circuits for tuning the latter to a like predetermined frequency differing by a relatively small frequency value from the normal source frequency, means common to the rectifiers for combining the rectified outputs thereof in polarity opposition thereby to provide said sound currents, and said reactive means including a transducer device for varying the frequencies of said input circuits in opposite senses relative to said source frequency.

12. In a system for indicating physical displacements of a mobile element, a source of high frequency oscillations of a predetermined frequency, a rectifier system provided with an output resistor, a network for providing amplitude modulation of said oscillations in accordance with displacements of said mobile element, said last network comprising a pair of reactances of like reactive sign, each of said reactances being tuned by a respective reactance of opposite reactive sign to said predetermined frequency, said mobile element being operatively associated with said last respective reactances for concurrently varying in opposite senses the magnitudes thereof, means applying said oscillations to said network, said rectifier system comprising a pair of rectifiers connected in polarity opposition, each rectifier being connected in a closed circuit with a respective one of said like reactances and said output resistor, and means applying the modulated oscillation output of said network to said rectifier system thereby to develop across said output resistor a voltage representative of said physical displacements.

JOSEPH G. BEARD.
ROBERT W. HARRALSON.